Patented Mar. 30, 1943

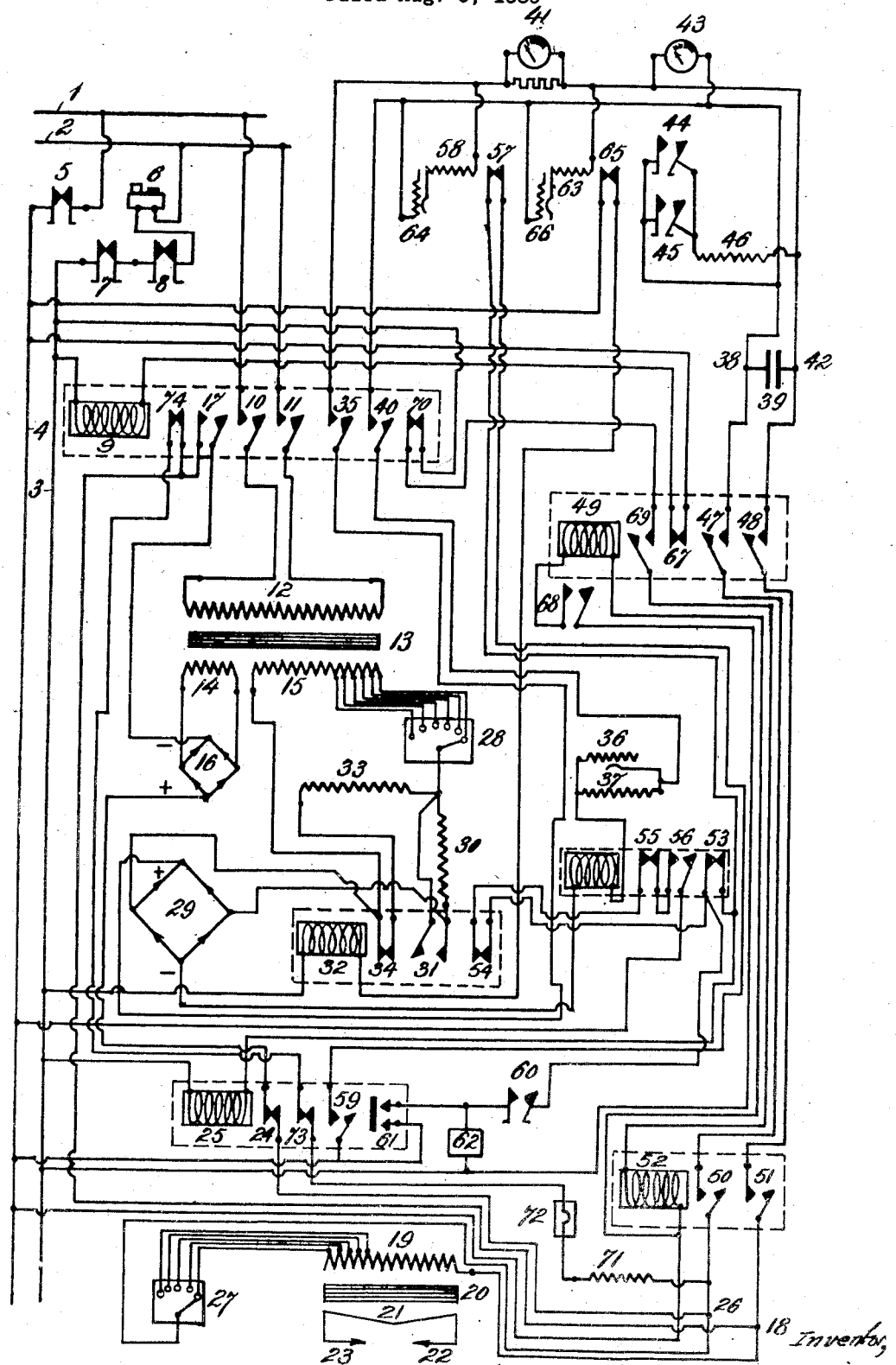

UNITED STATES PATENT OFFICE 2,315,093

RESISTANCE ELECTRIC WELDING MACHINE

Jacques Emile Jules Languepin, Paris, France; vested in the Alien Property Custodian Application August 9, 1939, Serial No. 289,301
In France September 28, 1938

17 Claims. (Cl. 171—119)

In many instances the resistance electric welding operation requires a very important power. In supplying resistance welding machines by means of distribution networks or feeders many difficulties are encountered due to the important value of the power absorbed by these machines, to their supply in single phase current and to the frequency in load variations.

On the other hand it is particularly difficult to accurately control the quantity of work supplied to the weld when the welding operation is effected in a very short time.

To avoid these various difficulties, it has already been proposed to store the supplied energy during a more or less extended period, in order to deliver a considerable power in a very short time.

Kinetic accumulation, and accumulation in a condenser have successively been used.

In carrying out this latter method practical difficulties are encountered, which may be avoided by the means and arrangements hereafter more fully described and pointed out in the appended claims.

These means and arrangements may be used for butt, spot or continuous welding.

The following description refers to a spot welding machine, but it is to be understood that it is applicable to a welding machine of other types as well as to a resistance heating machine without departing from the spirit of the invention.

When operating a spot welding machine wherein the transformer primary winding is supplied by means of a condenser discharge, the following difficulties are experienced:

(a) Irregularity of the welds due to the superposition of the remnant magnetic states in the iron of the transformer.

(b) Necessity of delaying for a comparatively extended time the spacing of the electrodes, in order to avoid pittings due to the persisting current of comparatively low value.

(c) Difficulty in securing the quick charging of the condenser while retaining accurately the final loading tension.

To avoid these difficulties, according to the invention means and arrangements or devices are provided essentially characterised by the following features:

(a) Before discharging the condenser a direct current is passed through the primary winding of the transformer in a direction opposite to that of the discharge current and having a constant value.

The duration and form of a condenser discharge in the primary winding of a transformer, the secondary winding of which is used for forming a spot, lap or butt weld, depend on the characteristics of the circuit.

Generally, characteristics are used which ensure a discharge in direct current or at least with a very rapid damping.

The operation being so conducted it is found that much better and more regular results are secured, when before the operation a direct current flowing in a direction opposite to that of the discharge current is caused to pass through the primary winding of the transformer. The power of the welding machine is increased as well as the regularity of the welds as regard strength and cross section.

For example, in a given spot welding machine, operating with a certain power and a certain adjustment giving regular spots on two thicknesses of $^{12}/_{10}$ths of a millimeter as a maximum, perfectly resistant and regular spots are obtained on two thicknesses of $^{15}/_{10}$ths of a millimeter if, before the weld is made, direct current is passed through the said primary winding in a direction opposite that of the discharge current and having the proper value to raise the induction in the iron of the transformer to about 10,000 Gauss.

The duration of flow of this current, which current is not important in itself, is without effect on the result provided the proper intensity is reached. Such current may be cut off immediately before the welding operation when the electrodes already are pressing together the parts to be welded, or it is preferably cut out before the electrodes are in engagement with the parts to be welded.

Within limits which are comparatively wide in practice, the period elapsing between the moment the magnetising current is cut off and the moment of the condenser discharge is without marked influence on the result. However the adjustment as regards the best value to be used for the intensity of the magnetising current, which adjustment may be effected by means of a resistance, is to be made with enough accuracy.

The cycle of operations may be performed manually by depressing successively the push buttons of the contacting devices, first completing the circuit of the magnetising current and then breaking this circuit before causing the discharge of the condenser. The magnetising current may also be allowed to flow in a permanent manner through the primary winding and be cut off during the welding operation only. For example in the case of a spot welding machine provided with pneumatic operating means, the supply circuit of the electro-valve of said machine may be used for ensuring the cut off operation of the magnetising current. The welding cycle may also be performed in an automatic manner by means of a suitable timing device of the usual type adapted to ensure the successive operations.

(b) Immediately after the condenser discharge is completed, or more exactly as soon as the potential value at the primary winding terminals of the transformer drops below a predetermined value the primary winding of the transformer and the condenser are short circuited momentarily.

(c) When the charge of a condenser of large capacity is ensured by means of a direct current generator, the drop of potential of the generator at the moment the supply circuit of the condenser is completed considerably limits the velocity of charge. To avoid this difficulty, use is made of a relay adapted to short circuit a portion of the induction regulator of the exciter as soon as the potential drops below a predetermined value.

When the direct current is supplied by means of a rectifier the phenomenon just referred to is amplified due to the internal voltage drop of the rectifier and to the presence of the condenser, so that for an apparent no-load direct voltage furnished by the rectifier, at the end of the loading period a very greater potential is available at the condenser terminals.

In this case the device referred to is used to control the potential supplied to the rectifier.

(d) A very accurate charge of the condenser is required and a control is to be provided to avoid that the condenser discharge may take place before its charge has been completed.

To this end use is made of an adjustable relay controlling the maximum voltage at the terminals of the condenser, and which inserts in the induction regulator or in the rectifier circuit a resistance adapted to adjust at the desired value the direct voltage supplied to the condenser.

The control ensured by such a relay is completed by means of a relay in the coil of which the whole or a part of the loading current for the condenser is caused to pass and which is adapted to discontinue the charging operation and to cause the discharge when the current has reached a predetermined lower value.

The described arrangement may be associated with any type of condenser now on the market. Preferably however use is made of electro-chemical condensers which are cheap as compared with other condensers.

In the following description reference will be made to a resistance electric welding machine, having a pneumatic actuating device and a suitable transformer.

Any welding machine of this type includes a single or double acting compressed air cylinder controlling the movement of the movable electrode, an electro-valve directing the air towards one or the other face of the piston moving within the cylinder, a pressure control device which enables the welding current to flow only when a suitable pressure has been placed on the electrodes, a contact device controlled by the rising movement of the electrode for the continuous running operation, a push button for placing under current the auxiliary fittings of the machine, an operating pedal, and a push button permitting the blow by blow or the continuous running operation.

These members, diagrammatically indicated in the accompanying drawing will not be described because they are all well known in the art and of common use in the construction of these machines.

As will be seen, the described operation by condenser discharge of a normal welding machine, requires the addition thereto of a battery of condensers and a direct current supply device which may be a generator or a rectifier fed through a regulating transformer.

The potential used for charging the condensers being usually somewhat high, a number of useful protecting devices have been indicated in the drawing. These protecting devices are mainly formed by contacts operated by the doors of the housing containing the battery of condensers or the doors of the machine giving access to the electrical members thereof.

Breaking of these contacts due to the opening of said doors causes the current to be cut off in the supply transformer and the short-circuiting of the battery of condensers around a resistance.

The single sheet of drawing shows a circuit arrangement embodying the invention.

Referring now to the drawing the current is supplied through the mains 1 and 2. The main 1 feeds the line 4 through the intermediary of a contact 5 normally closed. The main 2 feeds the line 3 through the intermediary of an on-off button 6 and two contacts 7 and 8. The contacts 5 and 7 are arranged to open when opening the doors giving access to the interior of the machine and the contact 8 is arranged to be opened when opening the door or doors of the condenser case.

The line 3 feeds the coil of a contact device 9. This contact device controls the two contacts 10 and 11 connected to the mains 1 and 2 respectively and supplying the primary winding 12 of a transformer 13.

This transformer is provided with two secondary windings 14 and 15. The secondary winding 14 which generates a comparatively low voltage, feeds a rectifier 16. The negative terminal of this rectifier is connected through the intermediary of the contact 17 of the contact device 9 to a terminal 18 of the primary winding 19 of the welding transformer generally indicated by the reference 20. The secondary winding 21 of this transformer is connected to the welding electrodes 22 and 23. The positive terminal of the rectifier 16 is connected through the intermediary of a normally closed contact 24 forming part of a contact device or relay 25 to the other terminal 26 of the primary winding 19 of the welding transformer 20. The connection between the terminal 26 and the primary winding 19 is made through the intermediary of a commutator 27 enabling said terminal to be connected to one of a series of intermediate points of this primary winding and to vary the number of the used turns of this winding.

The secondary winding 15 of the transformer 13 is connected at one side to one terminal of a rectifier 29 through the intermediary of a commutator 28 enabling the number of used turns of this winding to be modified, and a resistance 30. The other terminal of the secondary winding 15 is connected to the other alternating terminal of the rectifier 29.

This resistance 30 may be short circuited by means of a contact 31 of a contact device 32. Both ends of the secondary winding 15 are connected to a resistance 33 through the intermediary of a contact 34 controlled by the contact device 32.

The positive terminal of the rectifier 29 is connected through the contact 35 of the contact device 9, and the amperemeter 41 to one terminal 42 of a battery of condensers 39. The negative terminal of the rectifier 29 is connected through the coil of a relay 37 and its adjusting resistance 36 mounted in parallel therewith, and a contact 40 of the contact device 9 to the other terminal 38 of the battery of condensers 39. A voltmeter 43 always indicates the voltage at the terminals of the condenser battery. Contacts 44 and 45 controlled by the opening of the doors of the welding machine or of that of the doors of the condenser case are adapted for short circuiting the condenser through a resistance 46.

The condenser battery may be connected to the primary winding 19 of the welding transformer 20 through the intermediary of the contacts 47 and 48 of the contact device 49 and the contacts 50 and 51 of the contact device 52. The contacts 47 and 50 and the contacts 48 and 51 are arranged in series to avoid any possibility of a defective engagement between the contacts named when the discharge circuit is closed. The rebound of a contact during the discharge results in the rapid destruction of the contact device and such drawbacks are avoided by adjusting the contact device closing the first, the contact device 49, with a normal spacing between the contact members while the contact device which closes the contact device 52, has its contact members adjusted with a very small distance between them. Owing to the small stroke of the contact members of this contact device 52 any rebound of the contact members is avoided. This contact device also opening its contacts later than the contact device 49, no damage can occur to its contact members due to any interruption of the current.

Any wear will thus be distributed over the contacts of the contact device 49 which are adjusted the normal distance apart.

The coil of the contact device 25 is connected to the line 3 at one side and supplied at the other side through a contact 53 controlled by the rising movement of the electrode of the welding machine. The contact 53 is closed when the welding machine is at rest.

The supply current of the coil of the contact device 25 flows, past the contact 53, through a normally closed contact 54 of the contact device 32, then through the contact 55 forming part of the relay 37, and finally reaches the line 4 through the pedal or the push button 56 controlling the welding machine.

The coil of the contact device 25 may be supplied also through the contact 57 of the relay 58 and the contact 59 of the contact device 25. The contacts 54 of the contact device 32, 55 of the relay 37 and 56 of the pedal may be short circuited by means of an on-off button 60 controlling the blow by blow operation, and a contact 61 opening with a time delay of the contact device 25. This retardation contact 61 which is directly connected to the line 4 feeds, on the other hand, the electro-valve 62 controlling the supply in compressed air of the operating cylinder of the electrodes of the welding machine, said electro-valve being on the other hand connected to the line 3. The coil of the relay 58 and the coil of the relay 63 are connected to the terminals of the condenser battery through the intermediary of adjustable resistances 64 and 66.

The relay 63 operates a normally closed contact 65 supplying the coil of the contact device 32.

The coil of the contact device or relay 9 is directly connected to the line 3 at one side and it is connected on the other side to a normally closed contact 67 of the contact device or relay 49 and from this to the line 4.

The coil of the contact device 49 is connected directly to the line 4 at one side and on the other side it is connected to the line 3 through the intermediary of the pressure control contact 68. This contact 68 is arranged so as to close only when a suitable pressure has been placed on the electrodes. It may be devised according to various known arrangements usually used in the construction of electric welding equipment.

The coil of the contact device 52 is connected directly to the line 4 at one end and on the other end it is connected to the line 3 through the intermediary of a contact 69 of the contact device 49 and of a contact 70 of the contact device 9.

A lead including a resistance 71, a fuse 72, a contact 73 of the contact device 25, a contact 74 of the contact device 9 connects the two ends of the primary winding 19 of the welding transformer 20 when the contact devices 25 and 9 are at rest.

The operation is as follows.

When the on-off button 6 is operated, and closed, while the contacts 5, 7 and 8 are closed, the coil of the contact device 9 as well as the coil of the contact device 32 are energized.

The transformer 13 is then supplied through the contacts 10 and 11 which are closed. The secondary winding 14 feeds the rectifier 16 which in turn feeds the primary winding of the welding transformer 20 with direct current through the contact 24 of the contact device 25 and through the closed contact 17 of the contact device 9. Thus the magnetic core of the welding transformer 20 is magnetized to a predetermined state. The secondary winding 15 of the transformer 13 feeds the rectifier 29 through the commutator 28, and the closed contact 31 of the contact device 32. The resistance 30 being short circuited by the contact 31, a high potential is obtained at the terminals of the rectifier 29 enabling a rapid charge of the condenser battery to be obtained. The rectifier 29 feeds the condensers 39, through the intermediary of the contacts 35 and 40 of the contact device 9, the resistance 36, the coil of the relay 37 and the amperemeter 41.

Contacts 44 and 45 are in their opened position owing to the case enclosing the battery, and the doors of the welding machine being closed.

A voltmeter 43 indicates the potential at the terminals of the condenser being charged.

The relay 63 suitably adjusted by means of the resistance 66 operates when the potential at the terminals of the condenser battery reaches an appropriate value. At this moment this relay causes the opening of the normally closed contact 65 through which the coil of the contact device 32 was supplied. This contact device which was energized now opens and the resistance 30 is thus inserted in the feeding circuit of the rectifier 29 and the resistance 33 is then connected in parallel with said rectifier, so that current from the secondary winding 15 flows through the resistance 30 and the resistance 33 in parallel with the rectifier, thus lowering to a suitable value the potential at the terminals of the rectifier 29.

This arrangement is peculiar to the use of a dry or thermionic rectifier, supplied with a single or a three phase current for charging the condensers. With apparatus of this kind, it is known that the tension available on the direct current side is in fact substantially undulated or waved. It results from this that when a condenser is charged by means of such an apparatus, the charging potential obtained is not equal to the virtual value as usually measured but to the top or crest potential of the direct current wave. If this point of potential is to be avoided, the potential furnished in no load running conditions by the rectifier is to be lowered with the consequence of slowing the charge. The use of the relay 63 and of the described arrangement enables the charge to be quickly effected and a final charge potential of the condenser battery to be obtained which is independent of the potential used during the charging period.

A similar difficulty is experienced when attempts are made to effect the charge with a rotating generator. When feeding the condenser, the drop of potential in such a generator slows the charging rate. In this case the relay 63 may be used for actuating a contact device which inserts a resistance in the exciting circuit of the generator when the proper potential is obtained.

When the contact device 32 has dropped, the condenser 39 may be considered as charged. It remains supplied with the desired potential which is adjustable by means of the resistance 66, but there is however a very short moment during which a charging current yet passes after the operation of the relay.

Should the discharge of the condenser be effected before the charging current has dropped under a predetermined value, irregularities may be experienced.

To avoid this difficulty, the relay 37 is provided, the coil of which is arranged in series in the charging circuit of the condenser battery. This relay 37 breaks a contact 55 as long as the condenser charging current has not dropped below a predetermined value. This contact 55 prevents the discharge of the condenser to be caused and the weld to be effected.

The weld formation is controlled through the pedal (or button) 56. It can be seen that nothing occurs if the pedal is depressed while the contact 55 has not been closed by the relay 37 or while relay 63 has not caused the drop of the contact device 32. When the contact of the pedal 56 is closed and the relays 63 and 37 have operated, the contact device or relay 25 is supplied through the contact 53 closed by the electrode holder occupying its raised position, and the contacts 54, 55 and 56. The contact device or relay 25 closes a contact 59 which, through the intermediary of the contact 57, closes the feeding circuit of the coil of said contact device or relay 25. The contact 57 is closed because its actuating relay 58, adjusted by the means of resistance 64, is connected to the terminals of the condenser battery and operates as soon as the potential value of the condenser reaches a few number of volts. As from this moment the contact device or relay 25 is self locked, the operator may release the pedal without modifying the succession of the operations.

The closing of the contact device or relay 25 feeds the electro-valve 62 through the contact 61. This contact is mounted upon an apparatus of usual type in the trade so that it closes as soon as the contact device through which it is actuated has operated, but opens a moment after this contact device has opened, this time delay at the opening being however adjustable.

The operation of the electro-valve 62 causes compressed air to be fed upon the upper surface of the piston and consequently the upper electrode to be lowered. When the pressure is applied on the parts to be welded together, contact 68 closes. This contact is actuated through one of the pressure control devices commonly used in the construction of resistance welding machines.

The contact 68 causes the contact device 49 to be fed and this contact device closes the contacts 47 and 48 and breaks the contact 67. This contact 67 breaks the supply of the contact device 9 which, when it drops, breaks the supply of the transformer 12 through the contacts 10 and 11, breaks through the contact 17 the counter current in the primary winding of the welding transformer and causes the charging operation of the condenser battery to be discontinued through the opening of the contacts 35 and 40. It closed also the contact 70 which, through the intermediary of the contact 69 closed by the contact device 49 feeds the coil of the contact device 52. The contact device 52 closes the contacts 50 and 51 which, through the intermediary of the contacts 47 and 48 cause the condenser battery to discharge through the primary winding 19 of the transformer 20. The number of turns of this primary winding may be adjusted through the commutator 27. The current which flows through the primary winding 19 generates a heavy current in the secondary winding 21, thus causing the weld to be effected between the electrodes 22 and 23.

When the discharge of the condenser has been completed, the relay 58 drops. It breaks the contact 57 which feeds the coil of the contact device 25, the contact 53 being opened because the welding electrode is lowered. When dropping the contact device 25 closes the contact 73 which through the intermediary of the contact 74 occupying its closed position short circuits the condenser and the primary winding of the transformer through a resistance 71 and a fuse 72. This short circuiting has the result of reducing the damping period of the current in the transformer circuits.

The opening of the relay or contact device 25 also causes the opening of the contact 61, but as indicated this opening is effected with time delay and occurs only after such a period as sufficient for the current in the transformer being entirely damped and for the weld being chilled under pressure.

When contact 61 opens, it breaks the supply current of the electro-valve and the electrode rises even with the pedal 56 in depressed position. The movement of the electrode breaks the pressure contact 68, the contact device 49, is de-energized and the contacts 47, 48 and 69 are opened.

The opening of the contact 69 causes the breaking of the circuit of the contact device 52 and thus the opening of the contacts 50 and 51. The de-energization of the contact device 9 also causes the closing of the contact 67 of the coil circuit of the contact device 9 thus restoring the whole arrangement in the starting position.

The contact 53 closes when the electrode is raised or eventually, should this contact be provided with a retardation device, as usual in certain welding machines, one moment after the electrode has been raised. Should then the pedal 56 be retained in depressed position, the welding cycle repeats as soon as the charge of the condenser is completed, and the machine operates at the flight.

The contact 60 is actuated through a button. Should this contact be closed, it will be seen that the electro-valve 62 is supplied as soon as the pedal 56 is depressed. However the welding cycle may then be continued as above only when the pressure contact is closed and the control relays have operated. At the end of the cycle, when the relay or contact device 25 drops, and when contact 61 breaks, the electro-valve 62 remains supplied if the foot of the operator has been retained on the pedal.

The machine returns to the state of rest ready to operate again solely when the contact 56 is broken by releasing the pedal. The blow by blow operation is thus obtained.

I claim:

1. A resistance electric apparatus comprising an iron core transformer, a condenser, means for supplying current to the condenser to charge said condenser, means to discharge the said condenser in the said transformer, direct current supply means, a contact device having several contacts, another contact device having several contacts, a circuit including a contact of the first named contact device and a contact of the last named contact device and the primary winding of the transformer, a contact device having contact actuating means and a series of contacts, a contact of said series of contacts for actuating the first named contact device to supply direct current to the said primary winding through the first named contact and contacts of said series associated to the condenser discharge means, means for operating the contact actuating means of the last named contact device, whereby the flow of the direct current is cut out in the iron core transformer primary winding and the condenser is caused to discharge in said iron core transformer upon actuation of the last named means.

2. A resistance electric apparatus comprising an iron core transformer, a condenser, means for supplying current to the condenser to charge said condenser, means to discharge said condenser in said transformer, direct current supply means, a contact device having several contacts, another contact device having several contacts, a circuit including a contact of the first named contact device and a contact of the last named contact device and the primary winding of the transformer, a contact device having contact actuating means and a series of contacts, a contact of said series of contacts for actuating the first named contact device to supply direct current to the said primary winding transformer through the first named contact and contacts of said series associated to the condenser discharge means, means supplied with the iron core transformer current, contact means for starting the operation of the means supplied with the iron core transformer current, contact means actuated by the last named means and associated with the contact actuating means last named, whereby upon actuation of the contact means starting the operation of the means supplied with the iron core transformer current the flow of the direct current is cut out in the iron core transformer primary winding and the condenser is caused to discharge in the said transformer.

3. A resistance electric apparatus comprising an iron core transformer, a condenser, means for supplying current to the condenser to charge said condenser, an adjustable relay associated with said supply means, a contact operated by said relay when the condenser charge reaches a predetermined value, a first contact device comprising several contacts and actuating means therefor, said actuating means energized when the said relay operated contact is closed, a contact of the first contact device occupying its closed position when the said actuating means are de-energized, another relay associated with the condenser current supply means, a contact controlled by said relay and remaining closed as long as the condenser charging current has not dropped below a predetermined value, means supplied with the iron core transformer current, contact means for starting the operation of these last means and contact means actuated by the means supplied with the iron core transformer current when said means are operated, a second contact device comprising several contacts, actuating means for the second contact device controlled by the last named contact means, a condenser discharge circuit, contacts of the second contact device mounted in the condenser discharge circuit, a third contact device including several contacts and actuating means therefor, a contact of the second contact device controlling the contact actuating means of the third contact device, a circuit comprising a contact of the third contact device and the primary winding of the core transformer and direct current supply means for this circuit, whereby upon actuation of the said starting contact means the direct current supply to the transformer primary winding is discontinued and the condenser is caused to discharge in said transformer.

4. A resistance electric apparatus comprising an iron core transformer, a condenser, means for supplying current to the condenser to charge said condenser, means for discharging the condenser in the primary winding of the transformer, a first contact device having several contacts and contact actuating means therefor, condenser discharge starting means to operate the said contact device, a circuit, said circuit comprising direct current supply means, a contact of the said contact device and the primary winding of the transformer, a second contact device having contact actuating means and a series of contacts, contacts of said series associated to the condenser discharging means, means for operating the contact actuating means of the second contact device and actuated by the condenser discharge starting means, a circuit, said circuit comprising a contact of the first contact device, the primary winding of the transformer and a resistance, whereby direct current is passed through the primary winding of the transformer when the condenser discharge starting means are at rest, the condenser discharge is passed through said primary winding of the transformer, while the direct current supply therein is discontinued upon actuation of the condenser discharge starting means, and said primary winding is short circuited immediately after the condenser discharge is completed.

5. In an electrical control system, a condenser, means for supplying current to the condenser to charge said condenser, means for discharging the condenser, means for adjusting the charging potential of the condenser, means preventing the discharge of the condenser before the charge thereof is complete, a resistance for controlling the charging potential of the condenser, and a relay including a coil energized by the charging current of the condenser for interrupting the charging current and causing the discharge of the condenser when the charging current drops to a predetermined value.

6. In an electrical control system, a condenser, means for supplying current to said condenser to charge the condenser including direct current generating means, a contact device having a plurality of contacts, an excitation circuit for said direct current generating means including a resistance, an auxiliary circuit including one of said contacts for short-circuiting said resistance, another resistance, an auxiliary circuit including another of said contacts for connecting the second resistance in parallel with said excitation circuit, means for discharging the condenser, and a contact of said contact device associated with said discharging means for preventing said discharge during the charging of the condenser.

7. In an electrical control system, a condenser, means for supplying current to the condenser to charge said condenser including direct current generating means, an excitation circuit for said direct current generating means including a resistor, a contact device including a plurality of contacts and actuating means therefor, an auxiliary circuit including one of said contacts for short-circuiting said resistor when said actuating means are operated, a second resistor, an auxiliary circuit including another of said contacts for connecting the second resistor in parallel with said excitation circuit when said actuating means are inoperative, and adjustable relay energized when the condenser charge reaches a predetermined value, a contact associated with said actuating means operated by said relay when the same is energized whereby said actuating means is inoperative when the charge on the condenser reaches a predetermined value to short-circuit the first resistor and to connect the second resistor in parallel with the excitation circuit.

8. In an electrical control system, an iron core transformer, a condenser, means for supplying current to the condenser to charge said condenser, means for discharging the condenser, a direct current source, a contact device including a plurality of contacts, a second contact device having a plurality of contacts, a circuit including contacts of the first contact device and contacts of the second contact device and a primary winding of said transformer, means for actuating the first contact device to supply direct current to the primary winding, means including the condenser discharge means for actuating the second contact device to interrupt the flow of the direct current to the primary winding upon operation of the condenser discharge means.

9. The combination with a use circuit, of an electric condenser for supplying the same with an energy impulse at a precise potential, means for charging said condenser at a potential above said precise potential irrespective of line voltage variations, means whereby the potential of a charge on said condenser may be slowly reduced until at the desired value, and means for then discharging the condenser into said use circuit.

10. An electrical control system comprising, a transformer, a condenser, means for connecting the primary of said transformer with said condenser, means for charging said condenser at a higher potential than that at which it is discharged into the transformer, means for gradually reducing the potential of the charge on said condenser prior to discharge into said transformer, a circuit controlling the discharge of said condenser, a switch in said control circuit, and a relay for actuating said switch in response to the charge on said condenser being reduced to a predetermined value, whereby the condenser is adapted to supply a transformer impulse of uniform value.

11. An electrical control system comprising, a transformer, a condenser, means for connecting the primary of said transformer across said condenser, means for charging said condenser at a higher potential than that at which it is to be discharged, means for reducing the rate at which the condenser is charged, a circuit controlling the discharge of said condenser, a switch in said control circuit, a relay for actuating said switch in response to the charge on said condenser being reduced to a predetermined value, said relay being adapted to open said switch in response to a charge on said condenser above a predetermined value during the charging of the condenser and to close said switch after the condenser charge has been reduced to the desired value, whereby said relay and switch have the twofold function of preventing premature discharge of the condenser and insuring the discharge of a uniformly charged condenser.

12. In an electrical control system having therein a transformer, a condenser, means whereby the condenser may be discharged into the primary of said transformer, a load connected to the secondary of the transformer, a core for the transformer, means for premagnetizing the transformer core with unidirectional current of a polarity opposite to that of the condenser discharge impulse and of a value to reduce the tendency for current to persist in the transformer secondary, the improvement for obtaining uniform condenser discharges which comprises means for charging the condenser at a higher potential than that at which it discharges into the transformer, means for inserting a resistance into the circuit of the means for charging said condenser, and means for initiating the condenser discharge in response to the charge on said condenser being reduced to a predetermined value.

13. In an electrical control system having therein a transformer, a condenser, means whereby the condenser may be discharged into the primary of said transformer, a load connected to the secondary of the transformer, a core for the transformer, means for premagnetizing the transformer core with unidirectional current of a polarity opposite to that of the condenser discharge impulse and of a value to reduce the tendency for current to persist in the transformer secondary, the improvement for obtaining uniform condenser discharges which comprises means for charging the condenser at a higher potential than that at which it discharges into the transformer, means for inserting a resistance into the circuit of the means for charging said condenser, and means for closing a switch in a circuit for the condenser discharge in response to the charge on said condenser being reduced to a predetermined value, the potential of the condenser charging means being substantially larger than that of the premagnetizing current, and the resistance inserting means being responsive to a predetermined potential on said condenser.

14. An electrical control system comprising a transformer, a condenser, means for connecting the primary of said transformer across said condenser to discharge the condenser, means for charging said condenser at a higher potential than that at which it is discharged, means for introducing a resistance in the condenser supply, a circuit controlling the discharge of said condenser, a switch in said control circuit, a relay for actuating said switch in response to the charge on said condenser being reduced to a predetermined value whereby the condenser is adapted to supply a transformer impulse of uniform value, the potential of the condenser charging means being substantially larger than that of the premagnetizing current, and the resistance inserting means being responsive to a predetermined potential on said condenser.

15. An electrical control system comprising, a transformer having a magnetizable core, a source of alternating current, a condenser, a rectifier for charging said condenser from said source, means for connecting the primary of said transformer across said condenser in response to a reduction in the potential on said condenser to a predetermined value which is below that at which the condenser is initially charged, means for premagnetizing the core of said transformer with unidirectional current of opposite polarity to that of the condenser discharge impulse and of a value to reduce the tendency for current to persist in the transformer secondary, and means asynchronous with respect to said source of current for disconnecting the core premagnetizing means before discharge of said condenser.

16. In an electrical control system, a transformer including a magnetic core and a primary, a condenser, a source of alternating current, means for rectifying current from said source and supplying the rectified current to said condenser to charge the condenser, means for discharging the condenser through the primary of said transformer, and means asynchronous with respect to said source for supplying direct current through said primary in a direction opposite to that of the condenser discharge current whereby the core of the transformer is restored to a substantially similar state of magnetic saturation before each discharge of the condenser.

17. An electrical control system comprising, a transformer including a core and a primary winding, a source of alternating current, a condenser, means for supplying unidirectional current from said source to said condenser independently of the frequency of said source to charge said condenser, means for discharging the condenser through said primary winding, means for premagnetizing said core with unidirectional current of a polarity opposite to that of the condenser discharge, and means independent of the frequency of said alternating source for rendering the premagnetizing means inoperative before discharge of the condenser.

JACQUES EMILE JULES LANGUEPIN.